W. E. BOCK.
MACHINE FOR CUTTING WORMS.
APPLICATION FILED MAY 4, 1914.

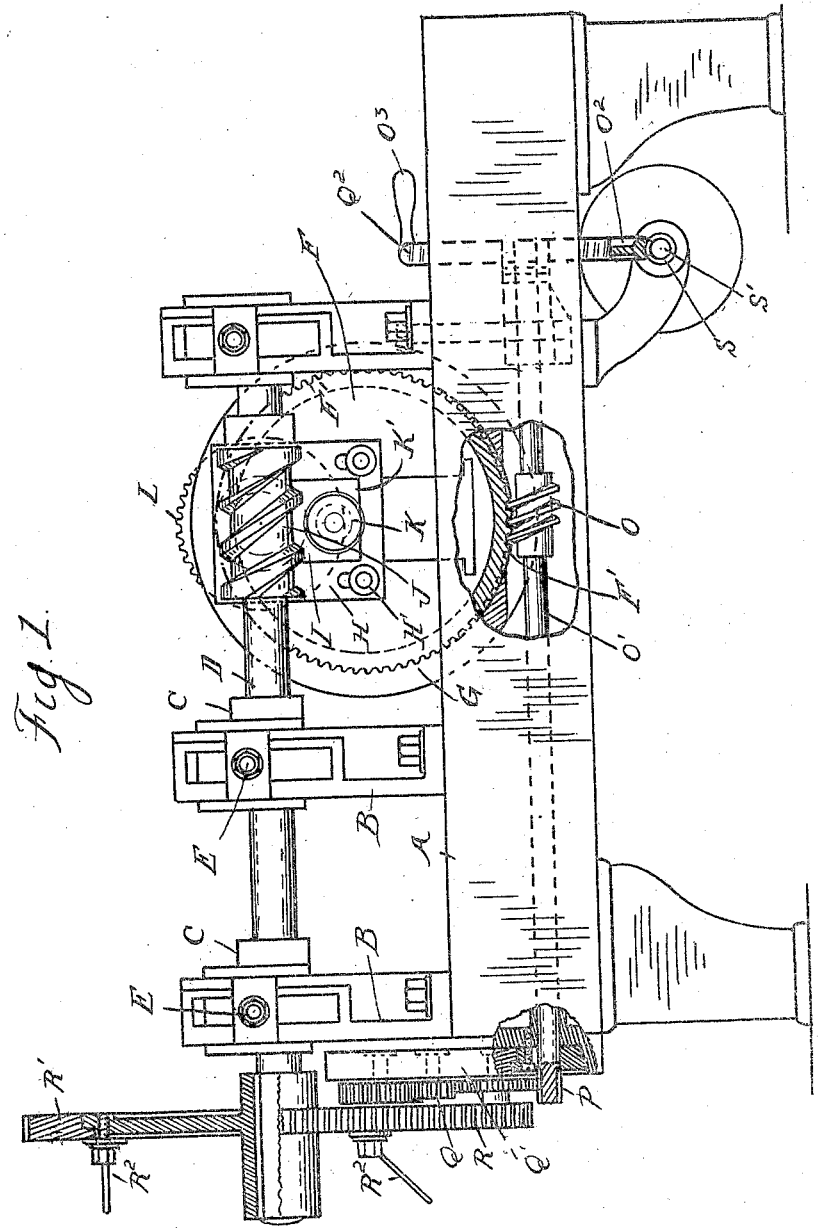

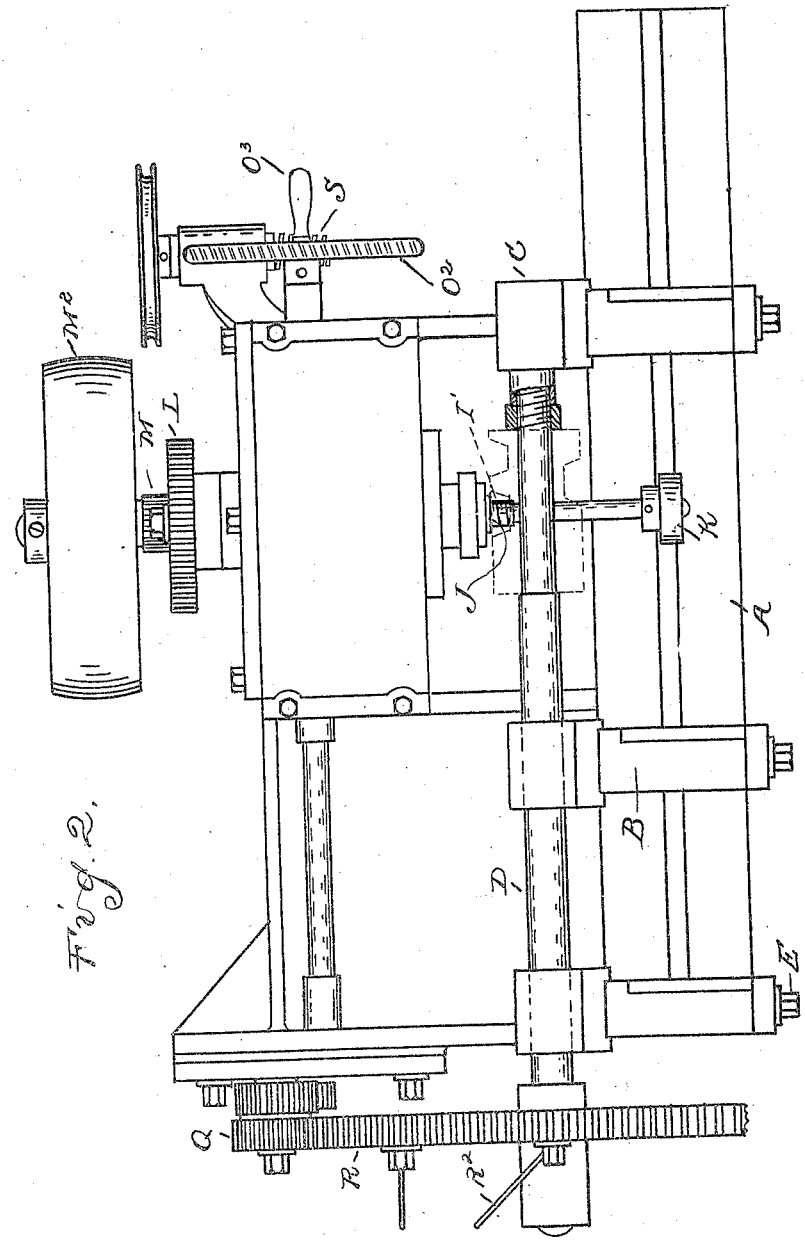

1,275,985.

Patented Aug. 13, 1918.

WITNESSES:
W. K. Ford
Phyllis Coburn

INVENTOR
William Emil Bock
BY
Whittemore Hulbert & Whittemore
ATTORNEYS

UNITED STATES PATENT OFFICE.

WILLIAM EMIL BOCK, OF TOLEDO, OHIO, ASSIGNOR TO THE BOCK WORM GEAR COMPANY, OF CLEVELAND, OHIO, A CORPORATION OF OHIO.

MACHINE FOR CUTTING WORMS.

1,275,985.

Specification of Letters Patent.   Patented Aug. 13, 1918.

Application filed May 4, 1914.   Serial No. 836,307.

*To all whom it may concern:*

Be it known that I, WILLIAM EMIL BOCK, a citizen of the United States of America, residing at Toledo, in the county of Lucas and State of Ohio, have invented certain new and useful Improvements in Machines for Cutting Worms, of which the following is a specification, reference being had therein to the accompanying drawing.

The invention relates to machines for cutting worms or spiral gears and more particularly to that class designed for use in coöperation with gears having roller teeth. It is the object of the invention to provide a simple mechanism for cutting blanks of various dimensions to any selected pitch.

In the drawings:—

Figure 1 is a side elevation of the machine;

Fig. 2 is a plan view thereof;

Figure 4:
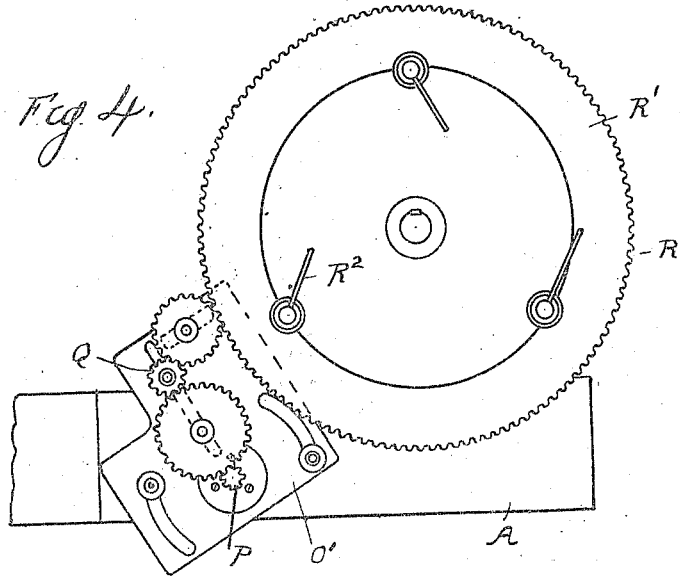
Fig. 4 is an end elevation of the change-gear mechanism.
Figure 3:
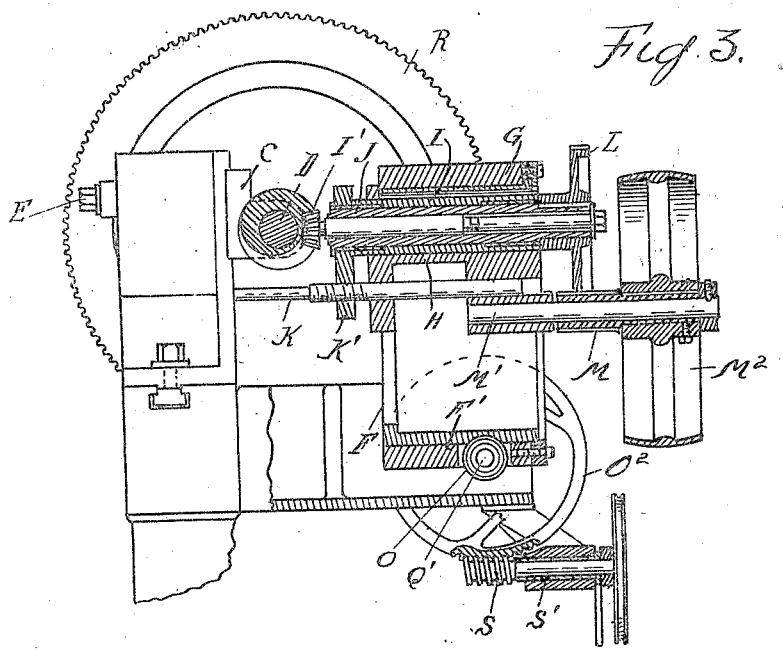
Fig. 3 is a cross section.

A is a suitable frame or bed upon which are mounted a series of vertical guides B having bearings C for the work-arbor D, vertically, adjustably, secured thereto by clamping bolts E. F is a rotary head secured in an annular bearing G mounted on the frame A adjacent to the work arbor and with its axis in a plane perpendicular to the axis of said arbor. H is a radially adjustable head mounted upon the rotary head F and carrying a journal bearing I for the arbor J of the rotary cutting tool. The head H may be adjusted to vary the eccentricity of the arbor J, being clamped in different positions by the clamping screws H'. The bearing I is also adjustable axially thereof in relation to the head H by suitable means, such as the screw K engaging a threaded aperture in the flange K' on the bearing I. The arbor J is revolved by a gear-wheel L which is in mesh with a pinion M upon a shaft M' normally concentric with the rotary head F, the pinion being of greater width than the gear-wheel to permit the longitudinal adjustment of the arbor and its journal bearing I. The pinion M is driven from a pulley M², to which motion is communicated by suitable means (not shown).

To perform the work of cutting the worm, the blank-carrying arbor D and the rotary head F are revolved in timed relation to each other. This is accomplished by an intermediate gearing, including change-gears which may be adjusted to obtain the desired ratio of movement. As shown, the rotary head F has worm-gear teeth F' formed on the periphery thereof, which are in mesh with a worm O upon a shaft O', having a pinion P in mesh with change-gears Q mounted on the adjustable plate Q'. These change-gears complete a driving connection with a gear-wheel R on the blank-carrying arbor D, and thus the head F and arbor D are compelled to rotate in a predetermined relation. Movement may be imparted to the train by any suitable means, but as shown a worm gear O² attached to the shaft O' is driven by a worm S upon the shaft S' and may be also hand operated by means of a handle O³ on the wheel O² when the worm S has been disengaged from the worm gear O² (not shown). Provision is also made for the independent rotation of the arbor D in setting the work, this being accomplished by providing the gear wheel R with a rotary adjustable ring R' secured in different positions of adjustment by clamps R².

With the construction as described, in performing the work, the blank from which the worm is to be cut is first mounted upon the arbor D and the latter is then adjusted the proper distance from the center of the rotary head F to correspond to the roller gear which is to coöperate with the worm. This adjustment is effected by loosening the clamping bolts E and adjusting the bearings C. The head H is then adjusted upon the roller head F to produce the desired eccentricity of the axis of the arbor J and bearing I, and the latter is adjusted by the screw K to move the cutter I' toward or from the axis of the blank arbor D. Thus, by means of these various adjustments the machine may be set to correspond to the particular worm which is to be cut, and the pitch of this worm may be varied by the change-gears Q. Motion is then communicated to the rotary cutter through the medium of the pulley M², pinion M, gear-wheel L and arbor J, and at the same time motion is communicated to the rotary head F and the blank-carrying arbor D through the drive connection described. This will cause the timed rotation of the head F and arbor D, with a result that the cutter I' will trace a spiral groove in the blank of the proper form to maintain rolling contact with the roller teeth of the coöperating gear. Where there are a plurality of grooves to be cut in the same blank, by loosening the clamps R² and shifting the gear rim R' on the gearwheel R, the blank may be properly set for the cutting of the second groove.

It will be understood that the worm cut by the machine as described will perfectly fit a coöperating gear, as the path of movement of the cutter I' exactly corresponds to the path of movement of the teeth on said coöperating gear. It will be also understood that where hardened worms are used they may be trued after the hardening process by substituting a grinder wheel for the cutter I'.

What I claim as my invention is:—

1. The combination with a frame, of a rotary blank-holding arbor mounted thereon, a rotary cutter on an axis transverse to the axis of said blank-holding arbor, rotatable in a path offset therefrom and parallel thereto, and timed mechanism for rotating said arbor and relatively moving said cutter laterally and longitudinally in relation thereto to cut a spiral groove of a predetermined pitch.

2. The combination with a frame, of a rotary blank-carrying arbor mounted thereon, a rotary head having its axis transverse to that of said arbor, a cutter arbor mounted eccentrically in said head, a cutter on said cutter arbor for engaging the blank, adapted to rotate partially on opposite sides of the horizontal plane passing through the longitudinal axis of the blank, and a change-gearing intermediate said rotary head and work-holding arbor for obtaining a predetermined ratio of movement thereof.

3. The combination with a rotary blank-bearing arbor, of a cutter arbor extending transversely thereto, a rotary member in which said cutter arbor is eccentrically journaled, a cutter on said arbor for engaging the blank, rotatable in a path offset from the axis of said blank-bearing arbor and parallel thereto, and means for relatively rotating said rotary member and rotary blank-bearing arbor in timed relation to each other.

4. The combination with a bed, of a blank-holding arbor mounted thereon, a rotary head having its axis transverse to the axis of said arbor, an annular bearing in which said head rotates, a cutter arbor, a bearing for said cutter arbor radially adjustably secured to said rotary head parallel to the axis thereof, a cutter on said arbor for engaging the blank, and a change-gear connection between said rotary head and blank-holding arbor.

5. The combination with a frame, of a rotary blank-holding arbor mounted thereon, a rotary head having its axis transverse to that of said arbor, a cutter arbor eccentrically journaled in said head and parallel to the axis thereof, connecting mechanism between said rotary head and work-holding arbor, including a change-gear, and means for rotatively adjusting said blank-holding arbor independent of said connecting mechanism.

6. The combination with a frame, of a rotary blank-holding arbor mounted thereon, a rotary head having its axis transverse to the axis of said blank-holding arbor a cutter arbor eccentrically journaled in said rotary head, an annular bearing for said rotary head, a peripheral worm gear on said rotary head, a worm engaging the same, a shaft on which said worm is mounted parallel to said blank-carrying arbor, a change-gearing between said shaft and arbor, and means permitting of the rotative adjustment in said change-gearing for setting said arbor in predetermined relation to said rotary head.

7. The combination with a frame, of a rotary blank-holding arbor adjustably mounted thereon, means for adjusting said arbor, a cutter arbor extending transversely to said rotary blank-holding arbor, a rotary member in which said cutter arbor is adjustably radially journaled, means for adjusting said cutter arbor, a cutter on said arbor for engaging the blank, and means for relatively rotating said rotary member and rotary blank-holding arbor in timed relation to each other.

8. The combination with a rotary blank-bearing arbor, of a cutter arbor extending transversely thereto, a rotary member carrying said cutter arbor, a cutter on said cutter arbor for engaging the blank, means for relatively rotating said rotary member and rotary blank-bearing arbor in timed relation to each other, and means for rotatively adjusting said rotary blank-bearing arbor independent of said rotary member, including a gear wheel having a rotary gear rim adjustably secured to the body portion of said gear wheel.

In testimony whereof I affix my signature in presence of two witnesses.

WILLIAM EMIL BOCK.

Witnesses:
 ADELAIDE I. ADAMS,
 JAMES P. BARRY.